(12) United States Patent
Duluk, Jr. et al.

(10) Patent No.: US 8,228,338 B1
(45) Date of Patent: Jul. 24, 2012

(54) HARDWARE OVERRIDE OF APPLICATION PROGRAMMING INTERFACE PROGRAMMED STATE

(75) Inventors: Jerome F. Duluk, Jr., Palo Alto, CA (US); Henry P. Moreton, Woodside, CA (US); Steven E. Molnar, Chapel Hill, NC (US); John S. Montrym, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1055 days.

(21) Appl. No.: 11/625,136

(22) Filed: Jan. 19, 2007

Related U.S. Application Data (60) Provisional application No. 60/864,374, filed on Nov. 3, 2006.

(51) Int. Cl.
*G06F 13/14* (2006.01)
*G06F 11/00* (2006.01)
*G06T 1/00* (2006.01)

(52) U.S. Cl. ............ 345/520; 345/501; 345/522; 714/49

(58) Field of Classification Search .................. 345/520, 345/501, 522; 711/122; 712/244; 714/10, 714/49
See application file for complete search history.

(56) References Cited

U.S. PATENT DOCUMENTS

| 6,046,752 | A | * | 4/2000 | Kirkland et al. ............... 345/520 |
| 7,382,366 | B1 | | 6/2008 | Klock et al. |
| 7,548,238 | B2 | | 6/2009 | Berteig et al. |
| 7,548,244 | B2 | | 6/2009 | Heirich |
| 7,739,556 | B1 | * | 6/2010 | Duluk et al. .................. 345/501 |
| 2004/0030834 | A1 | * | 2/2004 | Sharma ......................... 711/122 |
| 2007/0220370 | A1 | | 9/2007 | Branda et al. |
| 2009/0219288 | A1 | | 9/2009 | Heirich |
| 2011/0018884 | A1 | * | 1/2011 | Ritts et al. ..................... 345/522 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.
Notice of Allowance, U.S. Appl. No. 11/934,686, dated Feb. 2, 2010.

* cited by examiner

*Primary Examiner* — Chante Harrison
(74) *Attorney, Agent, or Firm* — Patterson & Sheridan, LLP (57) ABSTRACT

A method and system for overriding state information programmed into a processor using an application programming interface (API) avoids introducing error conditions in the processor. An override monitor unit within the processor stores the programmed state for any setting that is overridden so that the programmed state can be restored when the error condition no longer exists. The override monitor unit overrides the programmed state by forcing the setting to a legal value that does not cause an error condition. The processor is able to continue operating without notifying a device driver that an error condition has occurred since the error condition is avoided.

10 Claims, 9 Drawing Sheets

PRIOR ART

HARDWARE OVERRIDE OF APPLICATION PROGRAMMING INTERFACE PROGRAMMED STATE

CROSS-REFERENCE TO RELATED APPLICATIONS

This application claims benefit of U.S. provisional patent application Ser. No. 60/864,374, filed Nov. 3, 2006, which is herein incorporated by reference.

BACKGROUND OF THE INVENTION

1. Field of the Invention

Embodiments of the present invention relate generally to application programming interface and processor interactions and more specifically to a method and system for overriding programmed state in a processing pipeline.

2. Description of the Related Art

Unless otherwise indicated herein, the approaches described in this section are not prior art to the claims in this application and are not admitted to be prior art by inclusion in this section.

Graphics APIs are used to specify state controls used by a processor to process data and produce images. Ideally, the various state controls are orthogonal and any possible setting of a particular state control is valid. Unfortunately, certain state control combinations are "illegal" since they can produce an undefined result or cause an error condition that hangs the processor when the particular state control combination is used to process data. Examples of some illegal combinations include enabling both logic operations and alpha blending, enabling dual-source blending when the color target format is not blendable, or setting the active render target layer number to a number that exceeds the number of available layers in the render target.

Conventionally, a variety of schemes have been used to handle illegal state control combinations. One scheme is to simply program the processor without regard to whether or not the state control combinations are legal or illegal, and have the processor detect and report any illegal state control combinations as errors and halt any processing. Unfortunately, most graphics APIs do not provide a mechanism for indicating these errors to a user, so there isn't an effective way to remedy the error and allow the processor to resume processing. Therefore, that scheme is not useful in a production system.

Another scheme is to have the processor detect and report any illegal state control combinations as errors and halt any processing until a device driver intervenes and programs a legal state control combination. The device driver is burdened with maintaining the state control settings that were programmed by the API in order to determine a legal state control setting during error handling. The tracking of the programmed state controls and error handling performed by the device driver requires complex code and reduces the system processing performance since the processor is halted during the error handling.

Another scheme is to have the device driver detect and correct illegal state control combinations before sending them to the processor. This also requires the device driver to maintain the state control settings that were programmed by the API. In addition, it burdens the device driver with tests to detect illegal state control combinations, and then with the task of overriding illegal state control settings with legal ones. The tracking of the programmed state controls, checking for illegal state combinations, and checking to see if state controls have become legal again, requires complex code and reduces the system processing performance because of the storage and testing overhead, even if no error conditions are actually present.

Figure 1:
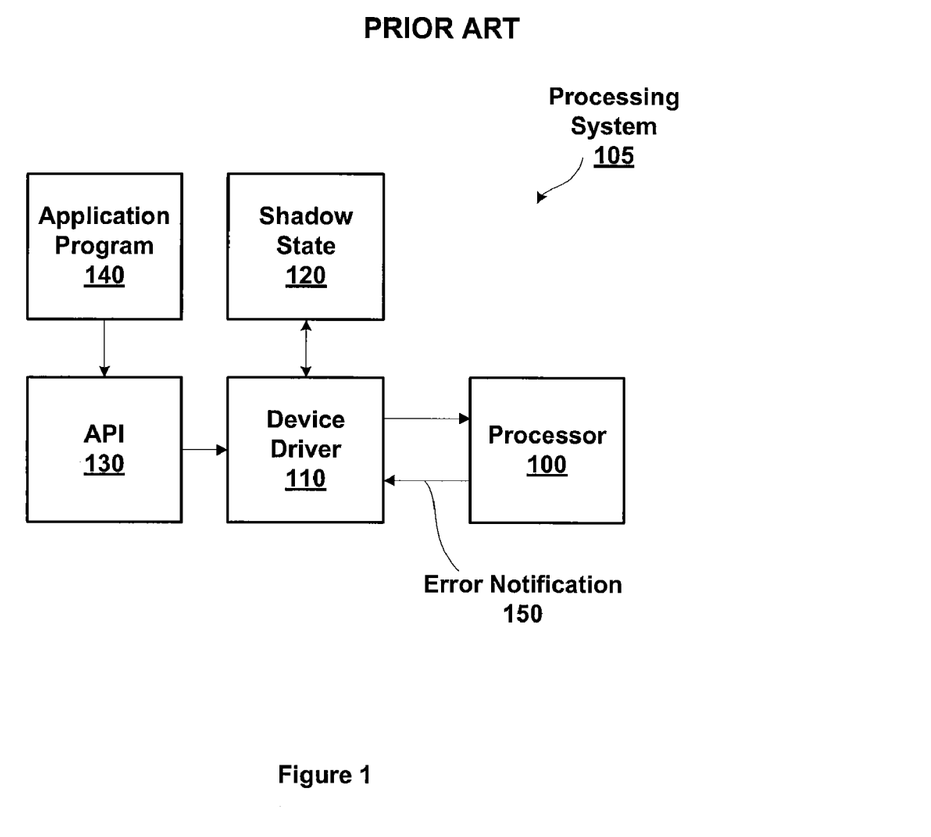
FIG. 1 is a simplified diagram of a prior art processing system including a device driver that maintains a copy of the API programmed state.

FIG. 1 is a simplified diagram of a prior art processing system 105 in which the device driver detects and corrects illegal state control combinations. Processing system 105 includes a device driver 110 that maintains a copy of the API programmed state as shadow state 120. An application program 140 provides data and program instructions that specify state controls defined by an API 130. Application program 140 calls a runtime component of API 130 that calls device driver 110 to translate the program instructions for execution by a processor 100. Device driver 110 determines if a particular state control combination is illegal, as defined by API 130, and replaces the illegal state control with a legal state control. Device driver 110 also preserves the desired state control that was provided by application program 140 by saving a copy of the API programmed state controls as shadow state 120. Shadow state 120 is used to detect illegal state control combinations and to determine legal state control settings during error handling.

As previously explained, the error detection, notification, and handling reduces the data processing throughput of processing system 105. In particular, device driver 110 includes complex code for performing the detection and error handling. Execution of this code for error condition detection, even when errors don't exist may also reduce the data processing throughput of processing system 105.

As the foregoing illustrates, a mechanism is needed to detect and correct API programmed state control error conditions without requiring a processor to halt while the error condition is remedied and without requiring the device driver to validate state combinations and to maintain shadow copies of overridden state.

SUMMARY OF THE INVENTION

A method and system for overriding state information programmed into a processor using an application programming interface (API) avoids introducing error conditions in the processor. An override monitor unit within the processor stores the programmed state for any setting that is overridden so that the programmed state can be restored when the error condition no longer exists. The override monitor unit overrides the programmed state by forcing the setting to a legal value that does not cause an error condition. The processor is able to continue operating without notifying a device driver that an error condition has occurred since the error condition is avoided. Therefore, the processing throughput of the system is not reduced when error conditions occur. Additionally, a device driver is not burdened with maintaining a copy of the desired API programmed state, detecting error conditions, and remedying the error conditions.

Various embodiments of a method of the invention for detecting and overriding graphics API programmed state settings include receiving a first graphics API programmed state setting, determining that an error condition will result from using the first graphics API programmed state setting in combination with other graphics API programmed state settings that are stored in a shadow state memory, overriding the first graphics API programmed state setting with a first override value to avoid the error condition and producing a first unit state that includes the other graphics API programmed state settings and the first override value, and processing data using functional logic that is configured as specified by the first unit state to produce processed data.

Various embodiments of the invention include a system for detecting and overriding graphics API programmed state settings. The system includes functional logic configured to process data according to state settings that include at least a portion of the graphics API programmed state settings and override values and an override monitor. The override monitor is coupled to the functional logic and configured to receive the graphics API programmed state settings and override a first graphics API programmed state setting with a first override value when a combination of the graphics API programmed state settings will cause an error condition.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for detecting and overriding API programmed state controls that produce error conditions in a processor is described. In the following description, for the purposes of explanation, numerous specific details are set forth in order to provide a thorough understanding of the present invention. It will be apparent, however, to one skilled in the art that the present invention may be practiced without these specific details.

Figure 2:
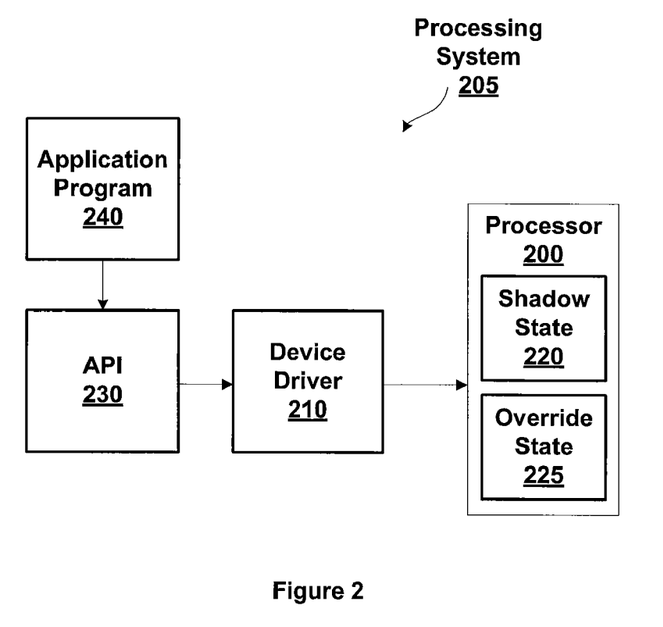
FIG. 2 is a simplified diagram of a processing system including a processor that maintains a copy of the API programmed state in accordance with one or more aspects of the present invention.

FIG. 2 is a simplified diagram of a processing system 205 including a processor 200 that maintains a copy of the API programmed state as shadow state 220, in accordance with one or more aspects of the present invention. Shadow state 220 can be the raw bits sent via the API, or shadow state 220 can be a logical translation of the raw bits sent via one or more APIs (e.g., the same conditions encoded into fewer bits). An application program 240 provides data and program instructions that specify state controls defined by an API 230. Application program 140 calls a runtime component of API 130 that calls device driver 210 to translate the program instructions for execution by processor 200. Processor 200 receives the program instructions and data from device driver 210, detects and remedies any error conditions caused by illegal API programmed state controls, and executes the program instructions to process the data.

In contrast with processing system 105 where shadow state 120 is stored and maintained by device driver 110, shadow state 220 is stored within and maintained by processor 200. Unlike device driver 110, a device driver 210 is not burdened with detecting and remedying error conditions or handling error notifications (resulting from API programmed state controls) received from processor 200. Therefore, the processing throughput of processing system 205 is improved compared with the processing throughput of processing system 105 that is hindered by error notification handling.

Processor 200 determines if a particular state control specified by a program instruction is illegal, as defined by API 230, and overrides the illegal state control with a legal state control. Processor 200 may be configured to detect illegal individual state control settings and override each setting as it is received. Processor 200 may also be configured to detect illegal combinations of state control settings before starting any data processing. Processor 200 also preserves the desired state control that was provided by application program 240 by saving a copy of the API programmed state controls as shadow state 220.

Shadow state 220 may be stored in a centralized storage resource, e.g., random access memory, register file, cache, or the like, within processor 200 or shadow state 220 may be stored in a distributed manner by specific processing units that use each portion of shadow state 220. Shadow state 220 is used to detect illegal state control combinations and to determine legal state control settings during error handling. Shadow state is also used by processor 200 to restore the API programmed state control settings when a subsequent state change removes the error condition.

Figure 3:
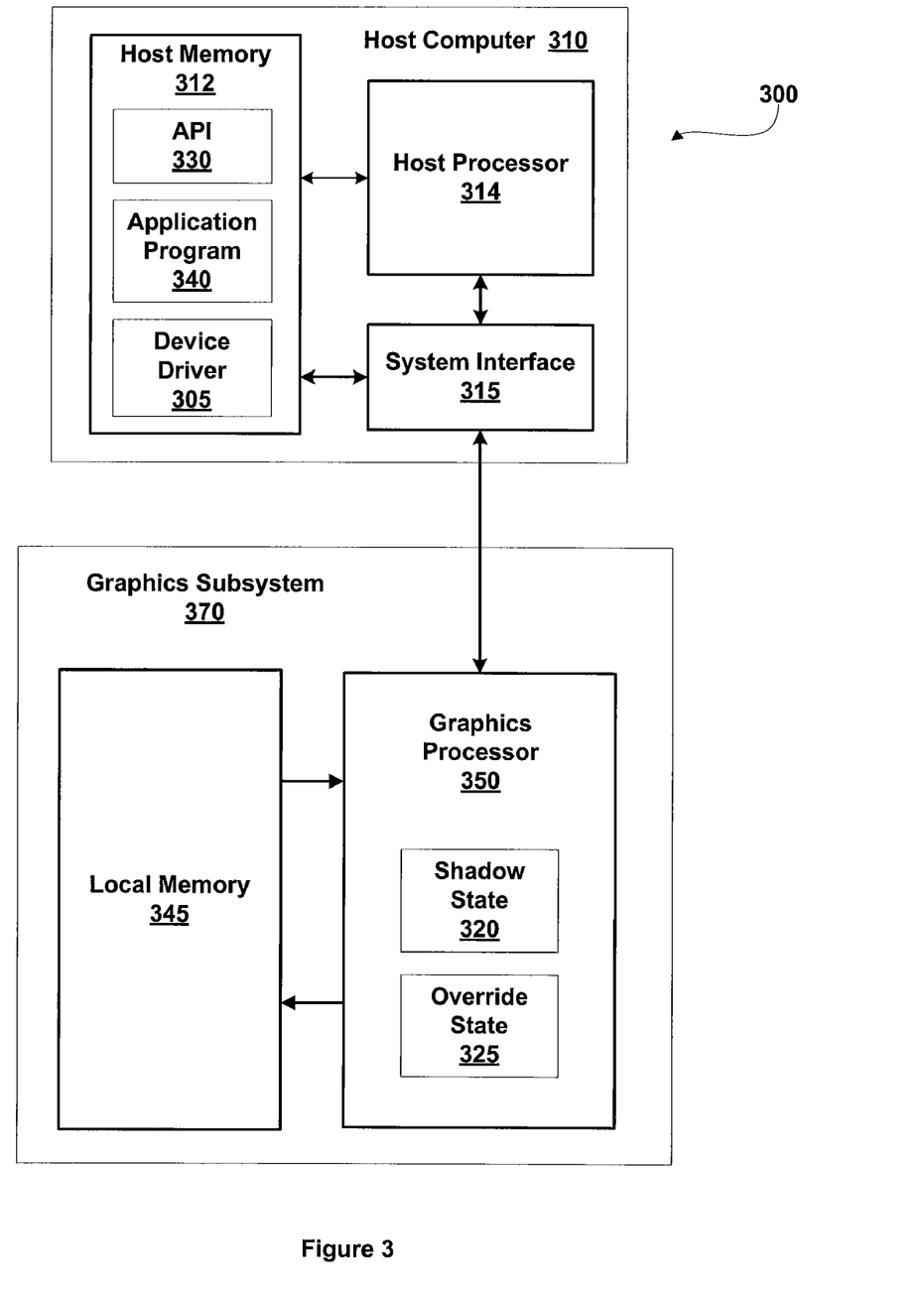
FIG. 3 illustrates a computing system including a host computer and a graphics subsystem in accordance with one or more aspects of the present invention.

FIG. 3 illustrates a computing system 300 including a host computer 310 and a graphics subsystem 370, in accordance with one or more aspects of the present invention. Computing system 300 may be a desktop computer, server, laptop computer, palm-sized computer, tablet computer, game console, cellular telephone, computer based simulator, or the like. Host computer 310 includes host processor 314 that may include a system memory controller to interface directly to host memory 312 or may communicate with host memory 312 through a system interface 315. System interface 315 may be an I/O (input/output) interface or a bridge device including the system memory controller to interface directly to host memory 312.

A graphics device driver 305 is stored in host memory 312 and is configured to interface between applications, such as application program 340 and a graphics subsystem 370. Graphics device driver 305 is executed by host processor 314 to translate instructions for execution by graphics processor 350 based on the specific capabilities of graphics processor 350. The instructions are specified by an API 330 which may be a conventional graphics API such as Direct3D or OpenGL. Because graphics processor 350 is configured to detect and override error conditions resulting from the API programmed state controls, device driver 305 does not need to maintain a copy of the desired state controls specified by the program instructions included in application program 340.

Graphics processor 350 stores and maintains a shadow state 320 that represents the API programmed state controls specified by application program 340. Graphics processor 350 also determines and maintains an override state 325 for state controls that have been overridden to avoid an error condition. In some embodiments of the present invention, shadow state 320 and/or override state 325 are stored in local memory 345. In addition to detecting and overriding illegal state conditions that are explicitly defined by API 330, graphics processor 350 may be configured to detect and override error conditions that are unique to graphics processor 350 based on a particular hardware limitation. Furthermore, graphics processor 350 may be configured to detect different illegal state conditions or specify different overrides depending on the particular API 330 that is used in computing system 300. Examples of conditions and override values that are used to avoid the possible error conditions are listed in TABLE

TABLE 1

| Condition | Override value(s) |
| --- | --- |
| When LogicOp is enabled | Blending is disabled for all render targets |
| If dual source blending is enabled | Multiple render target mode is disabled |
| Multisampling is disabled | AlphaToCoverage is disabled |
| Zero color targets are enabled | Alphatest is disabled |
| If a target format is not blendable | Blending for that render target is disabled |
| If the target format is not alpha testable | Alphatest for that render target is disabled. |
| For targets having a floating-point format or an sRGB format. | The logicop function is overridden to COPY |
| When compression is disallowed | Compression for the render target is disabled. |
| When ComponentBitWidths does not include both R and B components | The value of SwapRAndB is ignored and treated as FALSE |
| If the viewport MinZ value is outside the range represented by the Z buffer | The viewport MinZ value is clamped to the range of the Z buffer format |
| If the render target layer select is outside the programmed range | The render target layer select is treated as zero |

Host computer 310 communicates with graphics subsystem 370 via system interface 315. Data received by graphics processor 350 is processed according to the translated program instructions and the processed graphics data is written to a local memory 345 or host memory 312. Graphics processor 350 uses graphics memory to store graphics data and program instructions, where graphics data is any data that is input to or output from units within graphics processor 350. Graphics memory can include portions of host memory 312, local memory 345, register files coupled to the components within graphics processor 350, and the like. Graphics processor 350 includes one or more processing units that may each read and/or write graphics memory. In alternate embodiments, host processor 314, graphics processor 350, system interface 315, or any combination thereof, may be integrated into a single processing unit. Further, the functionality of graphics processor 350 may be included in a chip set or in some other type of special purpose processing unit or co-processor.

In a typical implementation graphics processor 350 performs geometry computations, rasterization, pixel texture mapping and shading computations and raster operations. In some embodiments of the present invention, graphics processor 350 is optionally configured to deliver data to a display device, network, electronic control system, other computing system 300, other graphics subsystem 370, or the like. Alternatively, data is output to a film recording device or written to a peripheral device, e.g., disk drive, tape, compact disc, or the like.

Figure 4A:
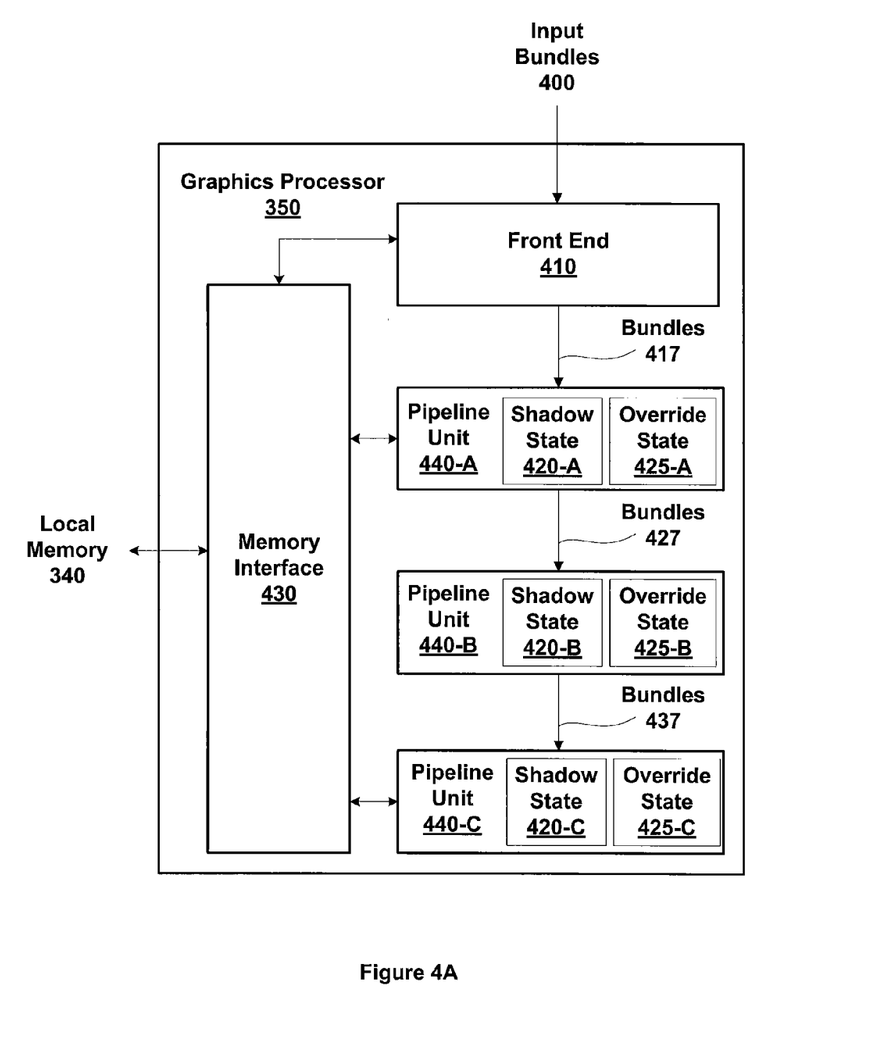
FIG. 4A illustrates a block diagram of the graphics processor shown in FIG. 3 in accordance with one or more aspects of the present invention.

FIG. 4A illustrates a block diagram of graphics processor 350 shown in FIG. 3, in accordance with one or more aspects of the present invention. Graphics processor 350 includes a front end 410, pipeline units 440-A, B, and C, and a memory interface 430. Front end 410 receives input commands 400 from device driver 305. In some embodiments of the present invention, input commands 400 may be stored in graphics memory and read by front end 410.

In one embodiment, Shadow state 320 and override state 325 are distributed within graphics processor 350 and stored in portions within each pipeline unit 420-A, B, and C rather than being stored in a single centralized location. Pipeline unit 440-A receives stream 417 that includes data packets and state bundles from the front end. Data packets contain rendering data to be processed by the graphics pipeline. State bundles are packets containing one more individual state settings that travel through the graphics pipeline in line with rendering data. State bundles may be identified with a flag, which distinguishes them from rendering data. In one embodiment, each state bundle has a state payload and an identifier tag (address), which indicates what state it contains and allows units to identify it and copy the state from the bundle when it is received. Pipeline unit 440-A includes a shadow state 420-A that includes the API programmed state control settings that are relevant for pipeline unit 440-A. Pipeline unit 440-A also includes an override state 425-A that may store a flag for each state control setting that is relevant for pipeline unit 440-A and may be overridden by pipeline unit 440-A.

Pipeline unit 440-A outputs a stream 427, including data packets and state bundles, to pipeline unit 440-B. Stream 427 may include all of the state bundles received by pipeline unit 440-A, or stream 427 may include fewer state bundles. Override values that are generated by pipeline unit 440-A are used within pipeline unit 440-A and are not included in stream 427. Pipeline unit 440-A may be configured to access graphics memory via memory interface 430 to process the data.

Similarly, pipeline unit 440-B processes the data included in stream 427 according to the state bundles that are also included in stream 427 and outputs stream 437 to pipeline unit 440-C. Shadow state 420-B and override state 425-B may include some of the same state control settings and override flags that are stored in shadow state 420-A and C and override state 425-A and C, respectively. Therefore, the override values for a particular setting may vary for one or more of pipeline units 440-A, B, and C based on how that particular setting is used within each pipeline unit.

Finally, pipeline unit 440-C processes the data included in stream 437 according to the state bundles that are also included in stream 437 and outputs the processed data to memory interface 430 for storage in graphics memory. In other embodiments of the present invention, pipeline unit 440-C outputs the data to another device, such as another processor or a device configured to display image data. Graphics processor 350 may include other processing units and/or additional or fewer pipeline units such as pipeline units 440-A, B, and C.

In some embodiments of the present inventions, pipeline units 440-A, B, and C, are configured to perform data assembly and vertex processing, primitive assembly and rasterization, and fragment processing and raster operations, respectively. In particular, pipeline unit 440-A may be configured to collect vertex data for high-order surfaces, primitives, and the like, and transform the vertex data as specified by the state bundles included in bundles 417. For example, pipeline unit 440-A may be programmed to transform the vertex data from an object-based coordinate representation (object space) to an alternatively based coordinate system such as world space or normalized device coordinates (NDC) space.

Pipeline unit 440-B may be configured to construct graphics primitives, e.g., points, lines, triangles, or the like, and transform the graphics primitives as specified by the state bundles in stream 427. For example, pipeline unit 440-B may be programmed to subdivide the graphics primitives into one or more new graphics primitives and calculate parameters, such as plane equation coefficients, that are used to rasterize the new graphics primitives. Pipeline unit 440-B may also be configured to rasterize the new graphics primitives and output pixel fragments and coverage data to pipeline unit 440-C as stream 437.

Pipeline unit 440-C may be configured to execute fragment shader programs, transforming pixel fragments received from Pipeline unit 440-B. For example, pipeline unit 440-C may be programmed to perform operations such as perspective correction, texture mapping, shading, blending, and the like, to produce shaded pixel fragments. Pipeline unit 440-C may read texture map data that is stored in graphics memory through memory interface 430 for use in processing the fragment data. Pipeline unit 440-C may also be configured to perform near and far plane clipping and raster operations, such as stencil, z test, and the like, and output pixel data to memory interface 430 for storage in graphics memory.

Figure 4B:
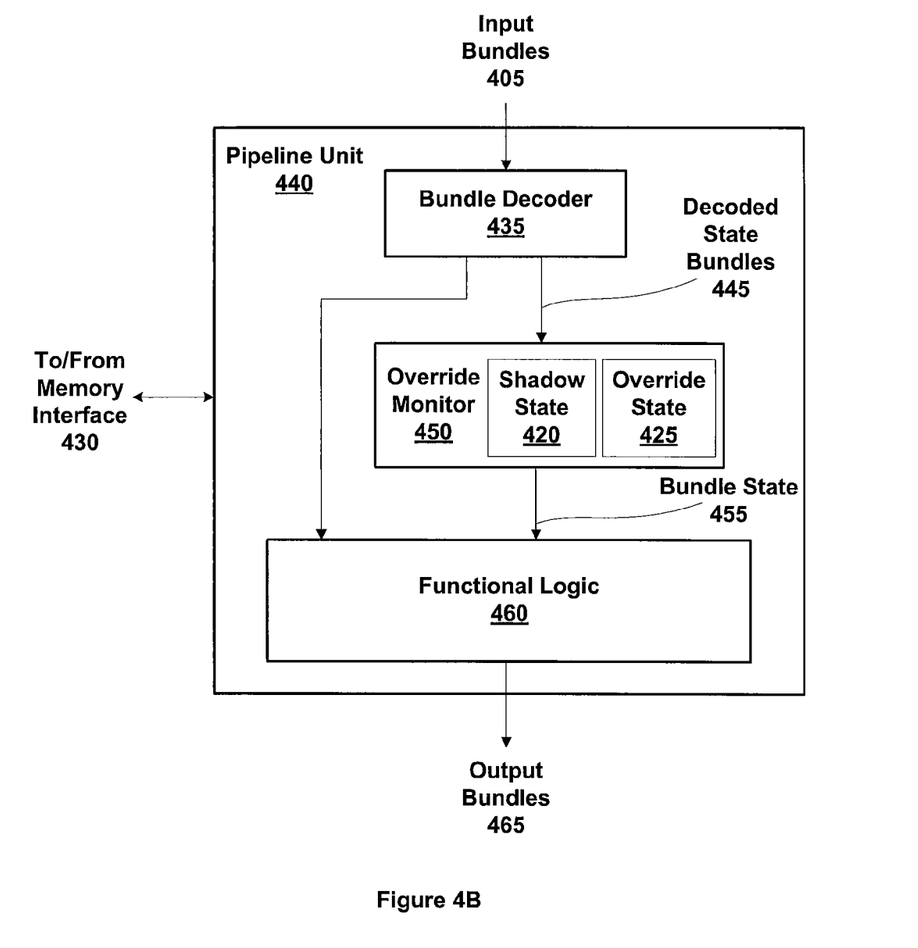
FIG. 4B illustrates a block diagram of a pipeline unit shown in FIG. 4A in accordance with one or more aspects of the present invention.

FIG. 4B illustrates a block diagram of a pipeline unit 440-A, B, or C, shown in FIG. 4A, in accordance with one or more aspects of the present invention. Pipeline unit 440 may be any one of pipeline units 440-A, B or C of FIG. 4A. Similarly, shadow state 420 and override state 425 may be shadow state 420-A, B, or C and override state 425-A, B, or C, respectively. Pipeline unit 440 includes a bundle decoder 435, an override monitor 450 and functional logic 460. Bundle decoder 435 receives input stream 405 and decodes the bundles included in input stream 405 to produce decoded state bundles 445 that are output to override monitor 450. Bundle decoder 435 outputs a portion of the state bundles received via input stream 405 as a portion of output stream 465. Functional logic 460 receives data packets included in input stream 405 for processing according to the state bundles and produces data packets that include the processed data. Data packets output by functional logic 460 are merged (using a multiplexer) with the state bundles output by bundle decoder 435 to produce output stream 465.

Override monitor 450 receives decoded state bundles 445 and detects any error conditions that may exist for the API programmed state controls. As previously described, error conditions may be explicitly defined by API 330 or may be based on a particular hardware limitation of functional logic 460. Override monitor 450 also detects when an error condition that has been overridden no longer exists, and restores the desired API programmed state control settings using shadow state 420 or using the current decoded state bundle. Override monitor 450 maintains shadow state 420 and override state 425 as described in conjunction with FIGS. 5A and 5B.

Override monitor 450 provides functional logic 460 with a unit state 455 that is used to control the processing of data performed by functional logic 460. Unit state 455 represents API programmed state control settings that do not cause error conditions and any override values for API programmed state control settings that do cause error conditions. At any point in time, one or more API programmed state control settings may be overridden with override values determined by override monitor 450. As previously described, the override values may be determined based on a particular API and they may be unique to each pipeline unit 440. Importantly, the override values are determined by API behaviors and the override function is transparent to the API 330, device driver 305, and host processor 314.

Figure 5A:
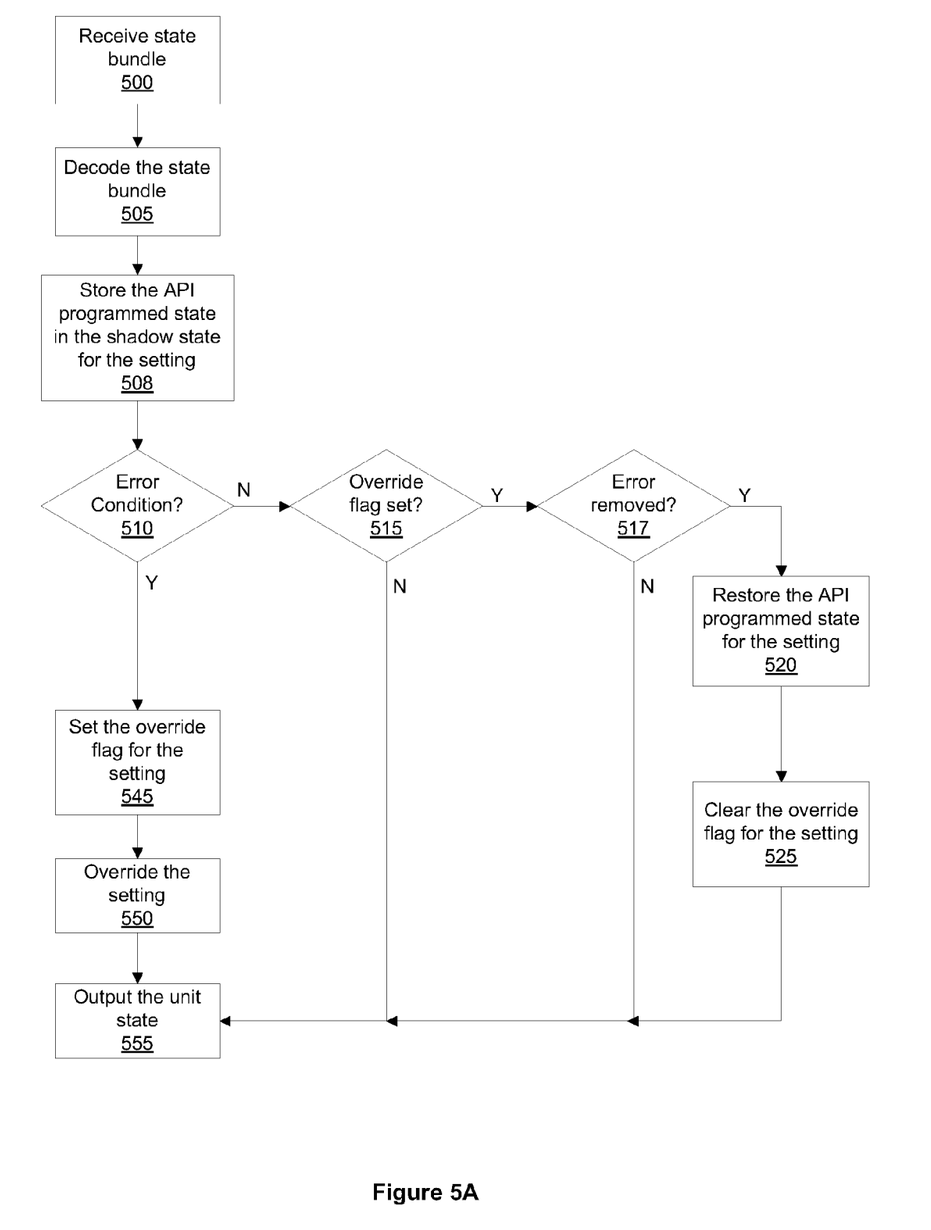
FIGS. 5A and 5B illustrate methods for overriding and restoring the API programmed state in accordance with one or more aspects of the present invention.

FIG. 5A illustrates a method for overriding and restoring the API programmed state controls, in accordance with one or more aspects of the present invention. In step 500 bundle decoder 435 receives a state bundle. In step 505 bundle decoder 435 decodes the state bundle and outputs a decoded state bundle to override monitor 450. In step 508, override monitor 450 stores the API programmed state setting provided by the decoded state bundle in shadow state 420. In step 510 override monitor 450 determines if an error condition will be caused by processing the decoded state bundle to update the bundle state. The error condition may be related to any setting specified by the decoded state bundle. In some embodiments of the present invention, override monitor 450 only checks for error conditions when a data packet is present, to avoid triggering overrides during illegal configurations that can temporarily occur as state settings change from one legal configuration to another. Such an embodiment is described in conjunction with FIG. 5B.

If, in step 510 override monitor 450 determines that an error condition will be caused by processing the decoded state bundle to update unit state 455, then in step 545 override monitor 450 sets the override flag for the API programmed state setting that is overridden to avoid the error condition. In some instances the API programmed state setting that is overridden is the setting provided by the decoded state bundle in override state 425. In other instances the API programmed state setting that is overridden is a setting was provided by a previously received decoded state bundle. The override flag indicates that the API programmed state setting has been overridden and does not match the setting stored in shadow state 420.

In step 550, override monitor 450 overrides a bundle state setting by providing an override value for the setting that does not cause an error condition. Importantly, the setting that is overridden corresponds to the override flag that was set in step 545. In some instances override monitor 450 overrides the API programmed state setting provided by the decoded state bundle. In other instances override monitor 450 overrides an API programmed state setting stored in shadow state 420 that causes an error condition in combination with the API programmed state setting provided by the decoded state bundle. In step 555, override monitor 450 outputs the unit state to functional logic 460 via unit state 455, including the API programmed state stored in shadow state 420 and any override values corresponding to override flags that are set in override state 425.

If, in step 510 override monitor 450 determines that an error condition will not be caused by processing the decoded state bundle to update the bundle state, then in step 515 override monitor 450 determines if an override flag is set that is related to the API programmed state setting provided by the decoded state bundle. Note that it is necessary to examine the override flag not just for the API programmed state setting provided by the decoded state bundle, but also for any other setting that may have been overridden to avoid an error condition.

For example, a first state bundle that sets blend enable true may not cause an error condition when logic operations are disabled. When a second state bundle is received that enables logic operations, blend enable is overridden to false to avoid an error condition and the blend enable override flag is set. At a later time, a third state bundle is received that disables logic operations, eliminating the error condition that caused the blend enable setting to be overridden. When the third state bundle is received, the blend enable setting should be restored and the override flag corresponding to the blend enable setting should be cleared. It is necessary to restore overridden settings in order to process the data as specified by the API used by the application program, i.e. to process the data as specified by the decoded state bundles.

If, in step 515 override monitor 450 determines that an override flag is not set that is related to the API programmed state setting provided by the decoded state bundle, then in step 555 override monitor 450 outputs the bundle state. Otherwise, in step 517 override monitor 450 determines if any setting that corresponds to an override flag identified in step 515 can be restored to the setting stored in shadow state 420 without causing an error condition. If no setting can be restored without causing an error condition, then in step 555 override monitor 450 outputs the overridden state to functional logic 460 via unit state 455. Otherwise, in step 520 override monitor 450 restores one or more settings that each correspond to an override flag identified in step 515. In step 515 override monitor 450 clears the override flag for each setting that is restored.

Figure 5B:
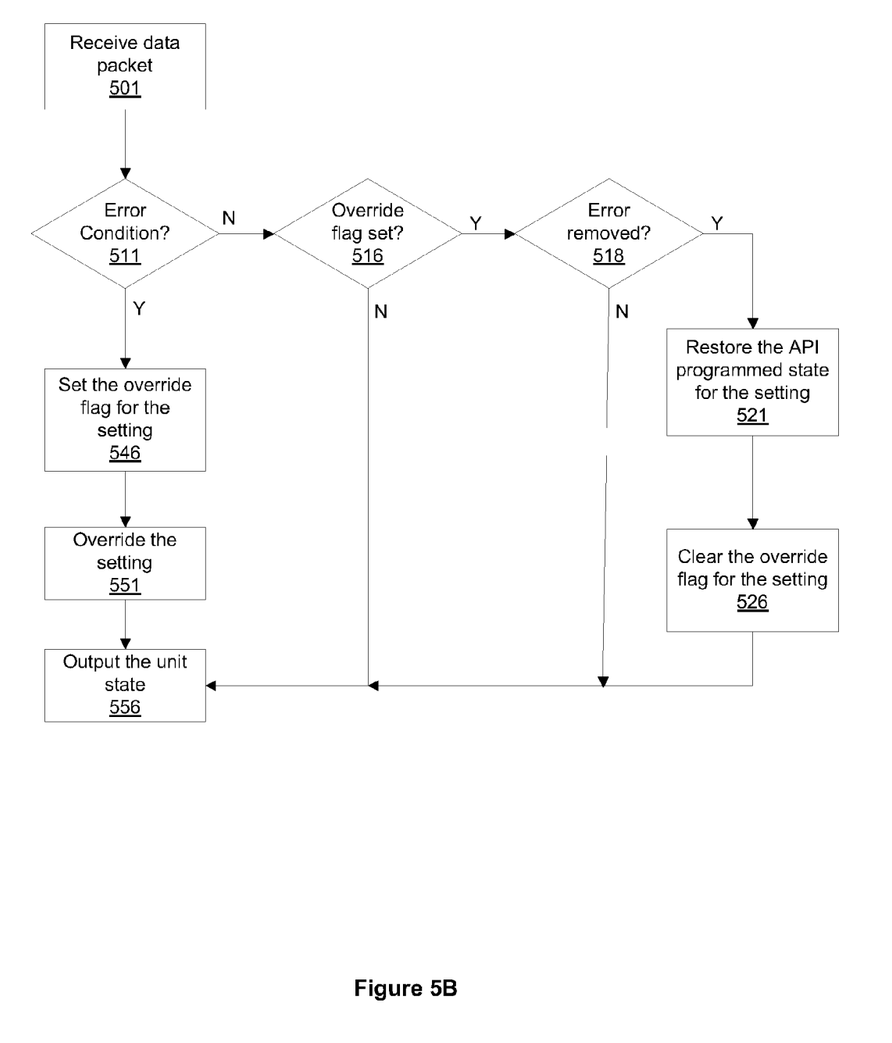

FIG. 5B illustrates another method for overriding and restoring the API programmed state controls, in accordance with one or more aspects of the present invention. In this embodiment, the API programmed state specified by decoded state bundles 455 is stored in shadow state 420 whenever a state bundle is received. Rather than detecting errors when a state bundle is processed, errors are detected when data packets are received to avoid triggering overrides during illegal configurations that can temporarily occur as state settings change from one legal configuration to another when a sequence of state bundles is processed. In step 501 bundle decoder 435 receives a data bundle and signals override monitor 450 to determine if the state specified by shadow state 420 needs to be overridden or if overridden state can be restored. Prior to receiving the data bundle in step 501, one or more state bundles or data bundles may have been received by bundle decoder 435.

In step 511 override monitor 450 determines whether the settings stored in shadow state 420 will cause an error condition. If, in step 511 override monitor 450 determines that the state settings stored in shadow state 420 will cause an error condition, then the method completes steps 546, 551, and 556. Steps 546, 551, and 556 correspond to previously described steps 545, 550, and 555. If, in step 511 override monitor 450 determines that the settings stored in shadow state 420 will not cause an error condition, then the method completes one or more of steps 516, 518, 521, and 526 before proceeding to step 556. Steps 516, 518, 521, and 526 correspond to previously described steps 515, 517, 520, and 525.

Figure 6A:
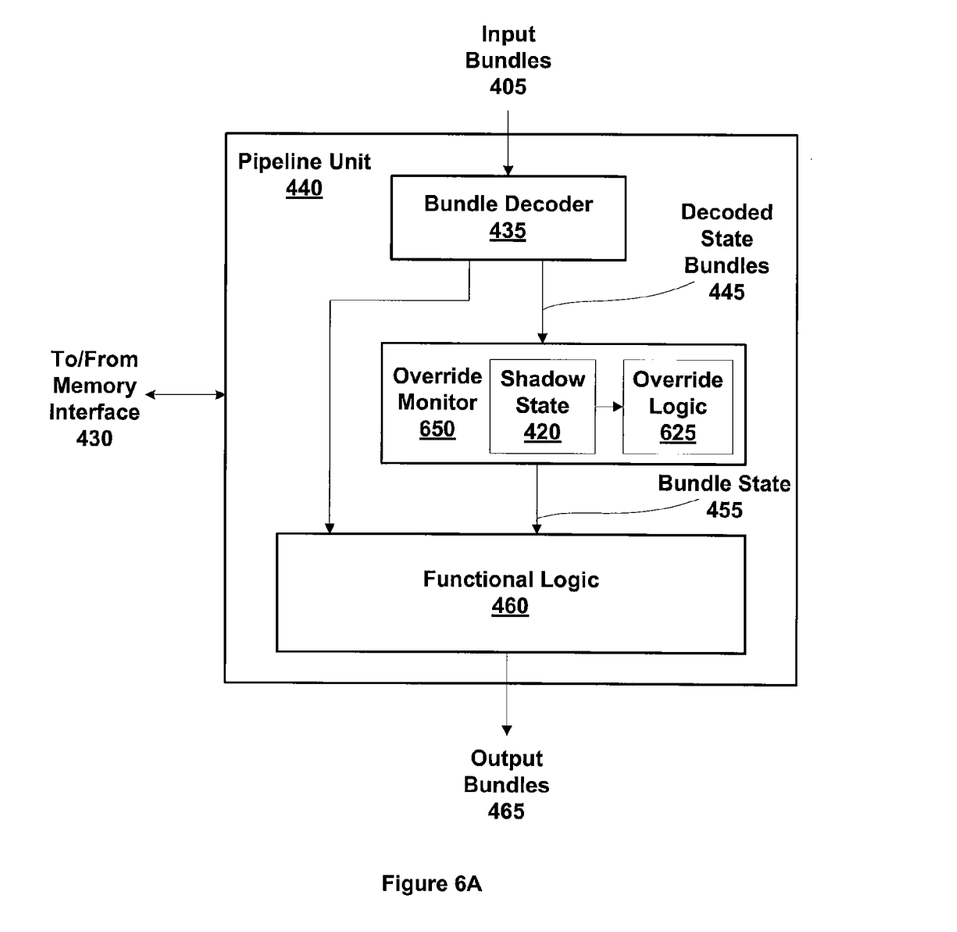
FIG. 6A illustrates another block diagram of a pipeline unit shown in FIG. 4A in accordance with one or more aspects of the present invention.

FIG. 6A illustrates another block diagram of a pipeline unit 440 shown in FIG. 4A, in accordance with one or more aspects of the present invention. In this embodiment, a stored override state, such as override state 425 is replaced by combinational logic, override logic 625. Override logic 625 includes override values that are embedded in the combinational logic. Shadow state 420 may be shadow state 420-A, B, or C and override logic 625 may replace override state 425-A, B, or C of FIG. 4A. Override monitor 650 receives decoded state bundles 445 and detects any error conditions that may exist for the API programmed state controls based on the API programmed state stored in shadow state 420, e.g., raw state programmed by the API.

Override monitor 650 maintains shadow state 420 as previously described and override logic 625 intercepts the API programmed state output by shadow state 420 and modifies any API programmed state controls included in bundle state 455 that would result in an error condition. When the error condition no longer exists, override logic 625 effectively restores the API programmed state controls corresponding to the API programmed state that is stored in shadow state 420. Override logic 625 may include one or more pipeline stages as needed to decode and modify the API programmed state controls. In particular, override logic 625 may include output registers that pipeline bundle state 455. Note that unit state 455 produced by override monitor 650 is the same as unit state 455 produced by override monitor 450.

Override monitor 650 provides functional logic 460 with a unit state 455 that represents the API programmed state control settings that do not cause error conditions and any override values for API programmed state control settings that do cause error conditions. As previously described, the override values are determined by API behaviors and the override function is transparent to the API 330, device driver 305, and host processor 314.

Figure 6B:
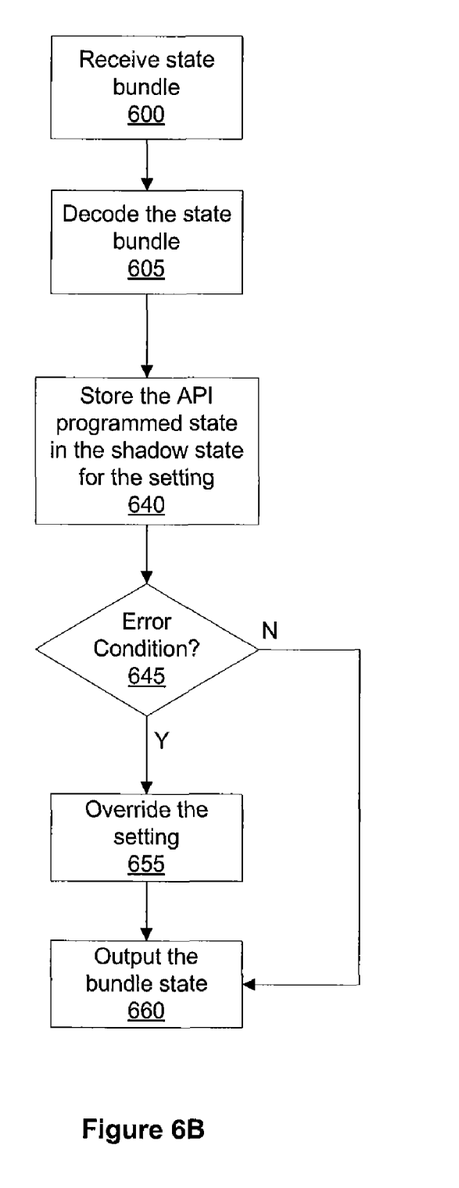
FIG. 6B illustrates a method for overriding the API programmed state in accordance with one or more aspects of the present invention.

FIG. 6B illustrates a method for overriding the API programmed state in accordance with one or more aspects of the present invention. Steps 600, 605, and 608 correspond to steps 500, 505, and 508 of FIG. 5, respectively. In step 645 override monitor 650 determines if an error condition exists for the combination of API programmed state settings that are stored in shadow state 420, and, if not, then override monitor 650 proceeds to step 660. The overridden API programmed state control setting is maintained by override logic 625 for output to functional logic 460 until the error condition no longer exists. When an error condition is removed, any previously overridden API programmed state settings are restored with the API programmed state settings that are stored in shadow state 420.

If, in step 645 override monitor 650 determines that an error condition will be caused by the API programmed state settings stored in shadow state 420, then in step 655, override monitor 650 overrides the API programmed state setting output by shadow state 420 to avoid the error condition. In some instances the API programmed state setting that is overridden is the setting provided by the current decoded state bundle. In other instances the API programmed state setting that is overridden is a setting was provided by a previously received decoded state bundle. In step 660, override monitor 650 outputs unit state 455 to functional logic 460, including the API programmed state stored in shadow state 420 and any override values corresponding to API programmed state setting that are modified by override logic 625.

Distributing the detection and overriding of API programmed state settings that cause error conditions allows each pipeline unit 440 to continue processing data while avoiding the error conditions. Offloading the detection and overriding tasks from a device driver may also improve the system processing throughput since the device driver does not need to track the shadow state, does not need to check for incompatible state settings, and does not need to handle error notifications generated by processor 200 or graphics processor 350 for each occurrence of an error condition. Although the detection and state override mechanisms have been described with specific reference to graphics API state settings, the detection and state override mechanisms may be used to avoid error conditions in a processor for other types of programmed state. Persons skilled in the art will appreciate that any system configured to perform the method steps of FIG. 5A, FIG. 5B, FIG. 6B, or their equivalents, are within the scope of the present invention.

In one implementation, to verify the proper operation of the error condition detection and overriding mechanism used for each override monitor 450 are first described in a configuration file. The bundles to be decoded by each bundle decoder 435 may also be defined in a separate definition file. The definitions of the bundles for each bundle decoder 435 may follow certain predefined naming conventions, initialization values, and default values to facilitate automatic generation of files for verification, simulation, and synthesis. A global build process can then take all the files mentioned above into account and generate a Verilog module for each bundle decoder 435 and override monitor 450 or 650 in graphics processor 350. These Verilog modules may be verified and synthesized to produce a semiconductor device that is configured to override API programmed state to avoid error conditions. Specifically, these Verilog modules may be used to produce the circuitry of override monitor 450 or 650.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A system for detecting and overriding graphics application programming interface (API) programmed state settings to avoid an error condition, comprising:
    functional logic configured to process data according to state settings that include at least a portion of the graphics API programmed state settings and override values representing at least one graphics API state setting to be modified to avoid the error condition;
    an override monitor implemented in hardware and coupled to the functional logic and configured to:
        receive the graphics API programmed state settings,
        override the at least one graphics API programmed state setting with a first override value representing the at least one graphics API state setting to be modified to avoid the error condition when a combination of the graphics API programmed state settings will cause the error condition, and
        later restore the at least one graphics API programmed state setting when another combination of the graphics API programmed state settings does not cause the error condition; and
    a shadow state memory within the override monitor that is configured to store the graphics API programmed state settings that are used to detect illegal graphics API programmed state setting combinations and to determine the override values for the graphics API programmed state settings.

2. A system for detecting and overriding graphics application programming interface (API) programmed state settings to avoid an error condition, comprising:
    functional logic configured to process data according to state settings that include at least a portion of the graphics API programmed state settings and override values representing at least one graphics API state setting to be modified to avoid the error condition;
    an override monitor implemented in hardware and coupled to the functional logic and configured to:
        receive the graphics API programmed state settings,
        override the at least one graphics API programmed state setting with a first override value representing the at least one graphics API state setting to be modified to avoid the error condition when a combination of the graphics API programmed state settings will cause the error condition, and
        later restore the at least one graphics API programmed state setting when another combination of the graphics API programmed state settings does not cause the error condition; and
    an override state memory within the override monitor that is configured to store a flag for each one of the graphics API programmed state settings that the override monitor is configured to override, wherein a particular flag corresponding to a particular graphics API programmed state setting indicates whether or not the particular graphics API programmed state setting has been overridden to avoid an error condition.

3. The system of claim 2, wherein override monitor is further configured to clear a flag corresponding to the first graphics API programmed state setting when the first graphics API programmed state setting is restored by overwriting the first override value with the first graphics API programmed state setting.

4. A system for detecting and overriding graphics application programming interface (API) programmed state settings to avoid an error condition, comprising:
    functional logic configured to process data according to state settings that include at least a portion of the graphics API programmed state settings and override values representing at least one graphics API state setting to be modified to avoid the error condition;
    an override monitor implemented in hardware and coupled to the functional logic and configured to:
        receive the graphics API programmed state settings,
        override the at least one graphics API programmed state setting with a first override value representing the at least one graphics API state setting to be modified to avoid the error condition when a combination of the graphics API programmed state settings will cause the error condition, and
        later restore the at least one graphics API programmed state setting when another combination of the graphics API programmed state settings does not cause the error condition; and
    additional override monitors and additional functional logic that are configured to process the data using a different portion of the graphics API programmed state settings, wherein each one of the additional override monitors is configured to detect and override a unique set of error conditions.

5. A system for detecting and overriding graphics application programming interface (API) programmed state settings to avoid an error condition, comprising:
    functional logic configured to process data according to state settings that include at least a portion of the graphics API programmed state settings and override values representing at least one graphics API state setting to be modified to avoid the error condition;
    an override monitor implemented in hardware and coupled to the functional logic and configured to:
        receive the graphics API programmed state settings,
        override the at least one graphics API programmed state setting with a first override value representing the at least one graphics API state setting to be modified to avoid the error condition when a combination of the graphics API programmed state settings will cause the error condition, and
        later restore the at least one graphics API programmed state setting when another combination of the graphics API programmed state settings does not cause the error condition, wherein circuitry of the override monitor is generated using a configuration file that defines a set of error conditions and corresponding override values for the graphics API programmed state settings.

6. A method for detecting and overriding application programming interface (API) programmed state settings to avoid an error condition, comprising:

receiving at least one graphics API programmed state setting;

determining that the error condition will result from using the at least one graphics API programmed state setting in combination with other graphics API programmed state settings that are stored in a shadow state memory;

overriding the at least one graphics API programmed state setting with a first override value representing the at least one graphics API state setting to be modified to avoid the error condition, wherein the first override value is selected by an override monitor implemented in hardware;

producing a first unit state that includes the other graphics API programmed state settings and the first override value;

processing data using functional logic that is configured as specified by the first unit state to produce processed data; and setting an override flag that corresponds to the first graphics API programmed state setting and is stored in an override memory.

7. The method of claim 6, wherein the override memory includes an override flag for each one of the graphics API programmed state settings that an override value is specified for.

8. The method of claim 6, further comprising:

receiving a second graphics API programmed state setting;

determining that an error condition will not result when the second graphics API programmed state setting is used in combination with the other graphics API programmed state settings that are stored in the shadow state memory;

clearing the override flag that corresponds to the first graphics API programmed state setting and is stored in the override memory; and restoring the first graphics API programmed state setting by replacing the first override value in the first unit state to produce a second unit state that includes the second graphics API programmed state setting and the first graphics API programmed state setting.

9. A method for detecting and overriding application programming interface (API) programmed state settings to avoid an error condition, comprising:

receiving at least one graphics API programmed state setting;

determining that the error condition will result from using the at least one graphics API programmed state setting in combination with other graphics API programmed state settings that are stored in a shadow state memory;

overriding the at least one graphics API programmed state setting with a first override value representing the at least one graphics API state setting to be modified to avoid the error condition, wherein the first override value is selected by an override monitor implemented in hardware;

producing a first unit state that includes the other graphics API programmed state settings and the first override value; and processing data using functional logic that is configured as specified by the first unit state to produce processed data, wherein the first graphics API programmed state setting enables blending and the first override value disables blending for all render targets when the other graphics API programmed state settings enable logic operations.

10. A method for detecting and overriding application programming interface (API) programmed state settings to avoid an error condition, comprising:

receiving at least one graphics API programmed state setting;

determining that the error condition will result from using the at least one graphics API programmed state setting in combination with other graphics API programmed state settings that are stored in a shadow state memory;

overriding the at least one graphics API programmed state setting with a first override value representing the at least one graphics API state setting to be modified to avoid the error condition, wherein the first override value is selected by an override monitor implemented in hardware;

producing a first unit state that includes the other graphics API programmed state settings and the first override value; and processing data using functional logic that is configured as specified by the first unit state to produce processed data, wherein the first graphics API programmed state setting enables dual-source blending and the first override value disables a multiple render target mode when the other graphics API programmed state settings enable the multiple render target mode.

* * * * *